May 31, 1932.　　　E. E. WEMP　　　1,861,251
CLUTCH
Filed May 14, 1928
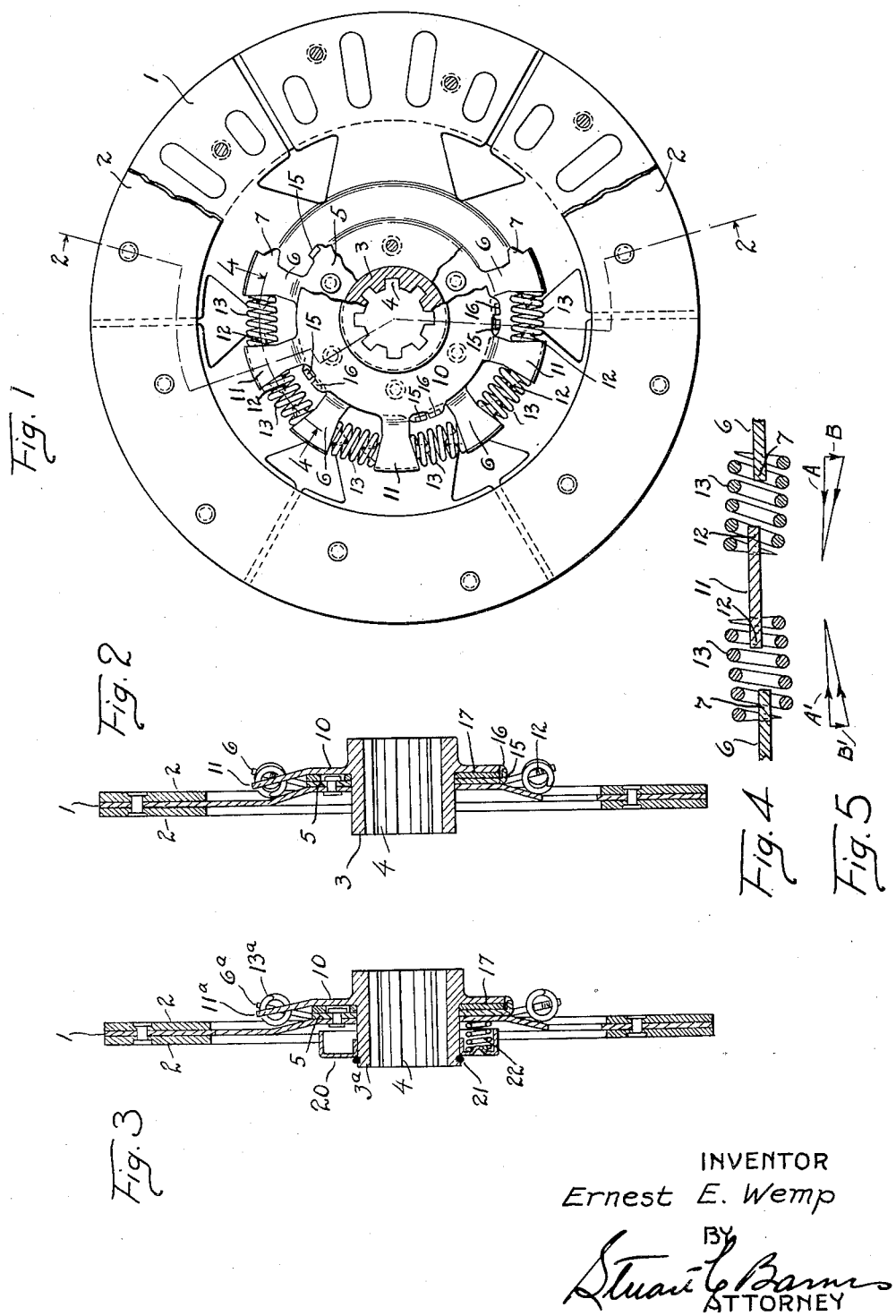
INVENTOR
Ernest E. Wemp
BY
Stuart C. Barnes
ATTORNEY Patented May 31, 1932

1,861,251

UNITED STATES PATENT OFFICE

ERNEST E. WEMP, OF DETROIT, MICHIGAN

CLUTCH

Application filed May 14, 1928. Serial No. 277,471.

This invention relates to a clutch adapted for use in an automotive vehicle, and has to do particularly with a clutch member through which the power is transmitted and which also is arranged to dampen vibrations.

The invention contemplates a construction which will dampen vibrations set up in an engine so as to prevent the vibrations from being communicated therethrough to the various mechanisms driven by the engine, and the invention may advantageously be embodied in a clutch, or rather a member of a clutch. This member of the clutch is constructed of parts capable of relative movement, which movement may be set up by vibrations, with a braking or friction action counteracting this movement in such a way as to deaden or kill the vibrations. Thus, vibrations of the engine itself are counteracted and dampened.

In the accompanying drawings:

Fig. 1 is a face view of a driven member of a clutch with some of the parts cut away and some of the parts in section illustrating the general construction of the member.

Fig. 2 is a section taken substantially on line 2—2 of Fig. 1 showing the parts which are capable of relative movement.

Fig. 3 is a view similar to Fig. 2 illustrating a slightly modified form.

Fig. 4 is an enlarged detail taken on line 4—4 of Fig. 1 illustrating the arrangement by means of which the power transmitted through the clutch aids in effecting the braking action.

Fig. 5 is a diagrammatic view illustrating certain lines of force present in the clutch.

In the accompanying drawings, the invention is shown as being embodied in a driven member of a clutch, and while it is thought to be preferable to embody the invention in this member, it is within the invention to embody the same in a driving member. This driven member is in the form of a disk 1 having frictional engaging material 2, and the disk is mounted upon a hub 3 splined as at 4 for attachment to a driven shaft. It will be understood that this disk member embodied in the clutch is to be packed up against one or more driving members which have frictional engagement with the material 2. This construction, however, is well known and need not be further described. One or more of such driven members may be embodied in a single clutch construction inasmuch as many clutch constructions do use several driven members alternating with driving members.

The disk 1 is not secured directly to the hub but is secured indirectly thereto by a construction which effects a dampening action. For this purpose the disk 1 may be relatively loosely fitted over the hub and may have secured thereto a spider, or ring 5 having projecting arms by means of suitable rivets, as shown. The projecting arms of this ring 5 are shown at 6 there being a number of such arms circumferentially spaced, as will be noted by reference to Fig. 1. These arms are provided with projections 7 for fitting into springs, as will presently be brought out.

The hub 3 is provided with a flange 10, which may be integral with the hub, or a separate flange suitably secured thereto. This flange is provided with radially extending projections 11 which alternate with the arms 6 (Fig. 1) and which are also provided with spring fitting projections 12. Interposed between the alternating projections 6 and 11 are coil springs 13 which fit over the projections on the arms.

When power is transmitted through this clutch member the disk 1 is rotated by reason of engagement with driving members (not shown); this effects rotation of the spider having arms 6, by reason of the spider being secured to the disk, which in turn causes a rotation of the hub through the springs interposed between the several arms 6 and 11. There will be at this time a tendency to compress the springs. Under an especially heavy load, or when the torque is especially great, there will be a considerable flexing of the springs, and means are provided for affording a positive drive under these conditions to protect the springs from an undue amount of distortion. However, in all normal operation positive drive is not utilized.

This means takes the form of lugs 15 and 16. There are a number of lugs 15 on the spider 5 and an equal number of lugs 16 on the flange 10. Each two lugs are slightly spaced from each other and are arranged to abut against each other to form a positive drive when the springs have been somewhat compressed. For example, viewing Fig. 1, assuming that the disk 1 is being rotated in a counter clock-wise direction; if the load is sufficiently heavy the springs will be compressed and the lugs 15 will move counter clock-wise and abut against the lugs 16 thus to positively drive the hub.

It will be observed that the spider 5 and flange 10 are thus capable of relative rotational movement upon the flexing of the springs. Such relative movement would come about by reason of vibrations in the engine. In order to deaden these vibrations and prevent their transmission through the clutch, a braking action is provided upon relative rotational movement of the spider and flange. This is accomplished by interposing suitable braking material 17 between the spider and flange, and the material may be floated in position and not secured to flange or spider.

When the engine is operated and the clutch connection is established, vibrations in the engine cause the springs 13 to flex. When an internal combustion engine is operated the crank shaft thereof not only has a rotary motion, but while so rotating has a slight oscillation due, perhaps, to power applications at various points along the length of the crank shaft which tend to twist it. This is more noticeable at certain speeds than at others. This is one of the sources of vibration which would tend to set up flexing of springs.

In order to counteract the flexing of the springs or to otherwise apply the braking action so as to kill off or deaden the vibrations, there must be a relatively tight frictional engagement of the frictional material 17 with the member with which it frictionally engages. For the purpose of effecting this, a novel arrangement of the arms 6 and 11 and springs 13 is provided. With reference to Fig. 2 it will be observed that the arms 6 and 11 are not positioned on the center lines of the springs but are positioned to one side thereof. The arms 6 and 11 are oppositely eccentrically disposed. This is shown in Fig. 2 in a somewhat exaggerated manner for the purpose of clearness. It is also shown in a somewhat exaggerated manner in Fig. 4.

When this member of the clutch is assembled the springs are compressed. The springs thus being compressed exert an expanding effort or force, and by reason of the arrangement of the arms 6 and 11 with respect to the springs this force is utilized to bring the frictional engaging surfaces together for effecting the braking action. In the diagrammatic view of Fig. 5 the normal direction of force of the spring at the right hand side of Fig. 4 is represented at A. By reason of the offset arrangement of the arms there is a component force B which extends substantially at right angles to the force A. This component force urges the ring 5 and flange together so that the interposed braking material is tightly engaged between the two. Inasmuch as the flange 10 is fixed tightly to the hub it may remain stationary while the ring 5 and the center portion of the disk are drawn towards the flange and the ring 5 and the flange and the friction material are packed tightly together.

The same action on the braking element is effected by all of the springs except that the positions of alternate springs are reversed. For example, compare the spring at the left side of Fig. 4 with the left hand side of diagrammatic view 5, the line of force exerted by this spring is represented at A' and the component force at B'. A vibratory action may tend to give the arms 6 an oscillation during its rotation so that there is a back-and-forth movement of all of the arms 6 relative to the arms 11. In one direction of the movement of this oscillation one arm 6 tends to approach the adjacent arm 11 thus compressing the intermediate spring, whereas the next adjacent arm 6 tends to pull away from the same arm 11, thus lightening the tension of the interposed spring. Upon reversal of the oscillatory movement the spring, formerly compressed, will be permitted to expand somewhat while the spring, upon which compression was lightened, becomes further compressed. However, all springs in normal operation are at all times under compression. For example, suppose the arms 6, viewing Fig. 4, tend to move from right to left as regards the arm 11; the component B will increase and the component B' will decrease; when the oscillation reverses, the arms 6 tend to move from left to right as regards the arm 11, the component B will decrease and B' will increase. Thus at all times there is a component force which packs the braking members together.

In the modified form shown in Fig. 3 the driven disk structure, hub structure, brake structure, etc., are the same, but the alternating driving arms 6a and 11a are centered on the springs 13a. Thus there is no component force for packing the driven disk and flange together for effecting a braking action. This packing together is accomplished by a separate mechanism which advantageously takes the form of a spring retaining ring 20 laced over the hub and secured thereto by a suitable lock ring 21, and holding a plurality of circumferentially arranged coil springs 22 which, at all times, pack the driven member up against the flange of the hub.

Claims:
1. A device through which power is transmitted for dampening vibrations which may arise from the source of power, comprising a pair of members one of which drives the other, means operatively connecting the members for rotational movement which permits relative rotational movement between them, which relative movement may be set up by vibration, means effecting a braking action against this movement comprising a frictional member with a braking surface substantially perpendicular to the axis of rotation, said connecting means being arranged so as to also act upon and effect a braking action of the said braking means.

2. A device through which power is transmitted for dampening vibrations which may arise from the source of power comprising, a pair of members, one of which drives the other, normally flexed spring means operatively connecting the members which permits relative movement between them, which relative movement may be set up by vibrations, means effecting a braking action against this movement, said spring connecting means exerting a force by reason of being flexed which acts upon said braking means to effect a braking action.

3. A device through which power is transmitted for dampening vibrations which may arise from the source of power comprising, a pair of members, one of which drives the other, spring means operatively connecting the members which permits relative movement between them, which relative movement may be set up by vibrations, means effecting a braking action against this movement, said spring connecting means being arranged to act upon and effect a braking action of the said braking means, said braking means including frictional engaging material disposed between said members and frictionally engaging them upon relative movement between them.

4. A device through which power is transmitted for dampening vibrations which may arise from the source of power comprising, a pair of members arranged in close proximity and one of which drives the other, friction material disposed between the members and frictionally engaging them, a connection between these members including normally flexed springs which permit relative movement between the members when vibrations exist by reason of flexing of the springs, means associated with the springs for effecting a component force to the force exerted by the flexed springs, said component force being in such a direction as to cause a tight frictional engagement between the friction material and the members whereby to apply a braking action to the flexing of the springs.

5. A device through which power is transmitted for dampening vibrations which may arise from the source of power, comprising a pair of members arranged in close proximity and one of which drives the other, friction material disposed between the members and frictionally engaging them, a connection between these members including normally flexed springs which permit relative movement between the members when vibrations exist by reason of flexing of the springs, means associated with the springs for effecting a component force to the force exerted by the flexed springs, said component force extending substantially at right angles to the line of force exerted by the springs.

6. A device through which power is transmitted for dampening vibrations which may arise from the source of power comprising, a pair of rotating members having frictional engagement with each other, a driving connection between the members including springs which permit of relative movement between the members, means associated with opposite ends of the springs, the means on one end being on one of said members and means in the other end being on the other of said members with the springs being compressed between the said means, said means being disposed eccentrically as regards the center line of the springs whereby the expanding force of the springs is divided into components, one of which acts upon the members to increase their frictional engagement with each other to thus effect a braking action to the relative movement permitted by the flexing of the springs.

7. A driven member of a clutch comprising, a disk, a hub, a plurality of springs, means carried by the disk and by the hub for supporting the springs which so connect the hub and disk to permit of relative movement upon flexing of the springs, said springs being normally flexed, frictional braking means which effects a braking action to this movement, said spring supporting means being arranged eccentrically of the springs so that a force exerted by the flexed springs is divided into components, one of which tends to move the hub and disk relatively to each other in an axial direction to tighten the frictional engagement of the braking means.

8. A driven member of a clutch comprising, a disk, a hub frictionally engaging the disk, a plurality of springs, means carried by the disk and by the hub for supporting the springs which so connect the hub and disk to permit of relative movement upon flexing of the springs, said springs being normally flexed, frictional braking means which effects a braking action to this movement, said spring supporting means being arranged eccentrically of the springs so that a force exerted by the flexed springs is divided into components one of which tends to draw the hub and disk together to tighten the frictional engagement and effect braking action.

9. A driven member of a clutch comprising, a disk, a hub, a plurality of circumferentially arranged arms carried by the disk, a plurality of similar arms carried by the hub, said arms on disk and hub being alternately arranged, coil springs between the arms which permit relative movement between the disk and hub upon flexing of the springs, means providing frictional engagement between the disk and hub to effect a braking action to the relative movement of the members, the said arms on the members being out of circumferential alignment so that a force exerted by the springs is divided into components, one of which is in a direction such as to draw the disk and hub together and tend to tighten the frictional braking engagement.

10. A driven member of a clutch comprising, a disk, a plurality of radially disposed arms carried by the disk, a hub having a flange, a plurality of radially disposed arms carried by the hub, the arms on the two members being alternately arranged, springs interposed between the arms which permit relative movement between the hub and disk upon flexing, said springs being normally compressed, the said arms being eccentrically arranged with regard to the center of the springs whereby the spring expanding force is divided into components one of which tends to pack the disk and flange together, and frictional engaging means between the disk and flange which applies a braking action to the relative movement between the disk and hub.

11. A driven member of a clutch comprising, a disk, a hub, a plurality of radially extending arms carried by the disk and similar arms carried by the hub arranged alternately with those on the disk, coil springs between the arms which form a yieldable connection between the disk and hub, fixed means on the disk and fixed means on the hub, both independent of the said arms, which are spaced in the normal position of the springs, said fixed means comprising lugs bent to extend in an axial direction and adapted to abut against each other upon sufficient flexing of the springs to establish positive driving connection between the disk and hub.

12. A driven member of a clutch comprising, a disk, a hub, a plurality of radially extending arms carried by the disk and similar arms carried by the hub arranged alternately with those on the disk, coil springs between the arms which form a yieldable connection between the disk and hub, a lug on the disk, a lug on the hub, said lugs being disposed radially inward from the springs and comprising parts bent to extend axially in spaced relation and arranged in circumferential alignment and adapted to abut against each other to form a positive driving connection between the disk and hub upon sufficient flexing of the springs.

13. A driven member of a clutch comprising a disk, a hub, said disk being freely mounted on the hub, means secured to the disk having a plurality of radially extending arms, a flange on the hub having similar arms, the said arms being alternately arranged and angularly disposed so as to intersect, springs disposed between the arms which, upon flexing, permit relative movement between the disk and hub, a plurality of lugs carried by the disk, and a plurality of lugs carried by the hub, the lugs on the disk and those on the hub being arranged in pairs and having axially extending parts in circumferential alignment and spaced radially inward from the springs, said lugs being normally separated when the springs are in normal position, said lugs, however, abutting together upon sufficient flexing of the springs to effect a positive driving connection between the disk and hub.

In testimony whereof I affix my signature.

ERNEST E. WEMP.